US005257348A

United States Patent [19]

Roskowski et al.

[11] Patent Number: 5,257,348

[45] Date of Patent: Oct. 26, 1993

[54] APPARATUS FOR STORING DATA BOTH VIDEO AND GRAPHICS SIGNALS IN A SINGLE FRAME BUFFER

[75] Inventors: Steven G. Roskowski; Elizabeth A. Clough, both of Menlo Park; Anthony D. Masterson, Cupertino, all of Calif.

[73] Assignee: Apple Computer, Inc., Cupertino, Calif.

[21] Appl. No.: 947,099

[22] Filed: Sep. 17, 1992

Related U.S. Application Data

[63] Continuation of Ser. No. 528,703, May 24, 1990, abandoned.

[51] Int. Cl.[5] .............................................. G06F 3/153

[52] U.S. Cl. ..................................... 395/157; 395/162; 358/152

[58] Field of Search ............... 395/153, 154, 157, 162; 340/715, 734, 747; 382/97, 152, 204, 213.22, 903; 358/213.22, 152

[56] References Cited

U.S. PATENT DOCUMENTS

| | | | |
|---|---|---|---|
| 4,870,663 | 9/1989 | Kulju | 367/94 |
| 4,933,877 | 6/1990 | Hasebe | 364/521 |
| 4,949,169 | 8/1990 | Lumelsky et al. | 358/86 |
| 4,994,912 | 2/1991 | Lumelsky et al. | 358/140 |
| 5,010,499 | 4/1991 | Yee | 364/521 |
| 5,046,001 | 9/1991 | Barker et al. | 364/200 |

*Primary Examiner*—Phu K. Nguyen
*Attorney, Agent, or Firm*—Blakely, Sokoloff, Taylor & Zafman

[57] ABSTRACT

A computer subsystem for presenting both video and graphic information on a computer output display in a computer system having a central processing unit and a frame buffer including apparatus for providing a video input signal representing full frame of video interlaced data, apparatus for selecting a rectangular portion of the video data to be presented, apparatus for converting the selected portion of the video signal into a stream of digitized pixel signals, apparatus for designating each such pixel of video information which is to be written to the frame buffer, and apparatus for addressing each of such pixels for storage at selected points of the frame buffer.

19 Claims, 4 Drawing Sheets

APPARATUS FOR STORING DATA BOTH VIDEO AND GRAPHICS SIGNALS IN A SINGLE FRAME BUFFER

This is a continuation of application Ser. No. 07/528,703, filed May 24, 1990, now abandoned.

BACKGROUND OF THE INVENTION

1. Field of the Invention

This invention relates to computer graphics systems and, more particularly, to methods and apparatus for storing signals appearing in both interlaced video and non-interlaced graphics modes in a single frame buffer for presentation on either an interlaced or non-interlaced output display device.

2. History of the Prior Art

It is the vision of many that in the near future a person sitting at a personal computer will be able to call information from a number of different sources. For example, it is expected that a person will be able to hear telephone and radio communications, view television or recorded motion pictures, play stereo recordings of music, and operate computer graphical and text programs. It is also expected that all of these operations will be possible at the same time so that, for example, a television program may appear in one window of a computer display while a computer graphics program is running in another window or computer graphics material may appear as an overlay on the television program.

It is much easier to visualize the results that one would like to reach than to reach those results, especially where the results require the combining of television (video) signals with computer graphics signals on the same output monitor. The crux of the problem is that, although both types of signals are electrical, they arrive in entirely different formats for their two purposes. The television signals are analog and must first be converted to digital representations for presentation on a computer monitor. Moreover, the television signals (video) are presented at a different frequency in an interlaced pattern consisting of a first field which may be approximately 240 active lines followed by a second field of approximately 240 active lines about one-sixtieth of a second later to form a complete picture. This allows a less expensive monitor to present pictures which are entirely acceptable for television. However, such a monitor is not acceptable for computer graphics where much more detail must be displayed and manipulated. Consequently, a typical computer monitor may display 480 lines of data in a non-interlaced mode.

Thus, the data from these two different sources of two different types, interlaced and non-interlaced, must somehow be presented in a form which can be handled by a personal computer. The usual method suggested is to convert the video data to digital data and place it in a first frame buffer, place the computer data in a second frame buffer, and somehow switch between the two frame buffers in presenting the data to an output monitor.

However, the video data stored in the frame buffer is still in interlaced form if it came from a television or similar source while the computer data is stored in non-interlaced form. The visionary also expects to be able to present the output on either an interlaced television type monitor or a computer monitor of some sort. Thus, interlaced video data and non-interlaced computer data must somehow be intermingled and displayed on both interlaced and non-interlaced monitors at the option of the operator.

Presenting interlaced data on a monitor designed to display interlaced signals is not a problem for such a monitor simply takes the 240 lines of interlaced information available in a first frame and presents it on the 240 lines available on the monitor. Then it follows this with the next 240 lines which are interleaved between and offset in time from the first 240 lines to make up the complete picture.

However, presenting the non-interlaced data on a monitor designed to display interlaced signals is a greater problem. Non-interlaced data has 480 lines which are not offset in time. If every other line is displayed to make up a first frame and then the alternate 240 lines are displayed to make up an interleaved second frame, the fact that the lines are not offset in time causes flickering which is disconcerting to the viewer. Consequently, the lines of the non-interlaced computer display must somehow be adapted to appear correct to the viewer when presented on an interlaced output monitor.

In a similar manner, presenting non-interlaced data on a monitor designed to display non-interlaced signals is not a problem for such a monitor simply takes the 480 lines of non-interlaced information available and presents it all on the monitor. However, presenting the interlaced data on a monitor designed to display non-interlaced signals is a greater problem. Interlaced data has only 240 lines per field followed by a second 240 lines which are offset in time. If the 240 lines from both fields are displayed together to make up a non-interlaced frame, the fact that lines which are time offset are presented together provides a picture which is incorrect when motion occurs. Consequently, the lines of the interlaced video display must somehow be adapted to appear correct to the viewer when presented on an non-interlaced output monitor.

Thus, it is clear that whether the monitor handles either interlaced or non-interlaced data, you must somehow change some of the data if both types are to be displayed on the same monitor.

An additional problem arises because of the nature of systems which are able to present information from a plurality of sources at the same time. Most computer systems accomplish this by means of windows, regions on a computer output display in each of which information from different programs may be presented. These windows may be moved about on the screen and retain the same information whatever position they are in. The information in any window may be manipulated apart from the other information on the output display.

It is desirable that this windowing ability be retained since the primary function of a computer is to deal with computer programs. Consequently, a video display should appear in a window. Although windows are usually rectangular, when a window is in the background on a computer display and is overlaid with other windows, the window is no longer a rectangle but an arbitrary shape. It is thus desirable that a video image be able to appear in such an arbitrarily shaped region on a computer output display. Moreover, it is desirable that a system be capable of intermixing computer graphics images with the video graphics display so that, for example, graphics or text material may overwrite the video images in the video window. Consequently, it is desirable that video images be placed in a completely arbitrarily shaped window on a computer output display.

SUMMARY OF THE INVENTION

It is, therefore, an object of the present invention to provide an arrangement for mixing data arriving in both interlaced and non-interlaced form to be presented on either an interlaced or a non-interlaced display monitor.

It is another object of the present invention to provide an arrangement for storing both video and computer images in a single frame buffer for presentation on an output display.

It is another object of the present invention to provide apparatus to allow the placement of video signals in an arbitrarily clipped region of a computer output display.

These and other objects of the present invention are realized in an arrangement which includes a computer subsystem for presenting both video and graphic information on a computer output display in a computer system comprising means for providing a video input signal representing a full frame of video interlaced data, means for selecting a rectangular portion of the video data to be presented, means for converting the selected portion of the video signal into a stream of digitized pixel signals, means for designating each such pixel of video information which is to be written to the frame buffer, means for addressing each of such pixels for storage at selected points of the frame buffer, and means for presenting data stored in both video and computer graphics form in a frame buffer on interlaced and non-interlaced output monitors.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1A:
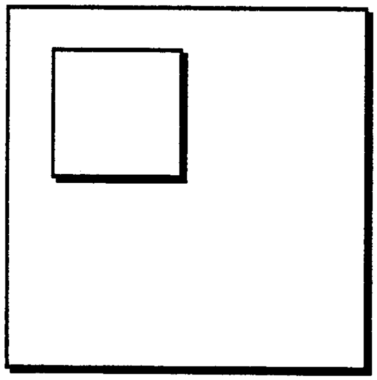
FIGS. 1(*a* and *b*) are a diagram illustrating the result desired in presenting video signals on a computer output display.
Figure 1B:
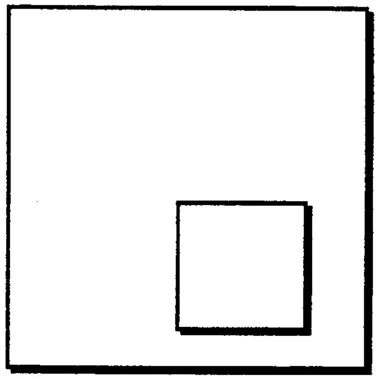

FIGS. 1(*a* and *b*) illustrate in the leftmost rectangle an input video image which might be furnished to a television screen for display. This same video image is presented to the computer system of which the present invention is a part, and it is desired that the portion of the video image shown in the smaller inner rectangle be presented on the computer output display. The computer output display is illustrated in the rectangle to the right in the figure, and the smaller rectangle shown therein represents the window in which the video image taken from the smaller rectangle in the input image to the left is to be displayed. It should be noticed that the two smaller rectangles are not at the same positions within the larger rectangles.

It will be appreciated that if the image taken from the left area is placed in the area to the right, if the area from which the image is taken is moved about, then the image appearing in the right window will pan across (and possibly up and down) the total image to the left. If, on the other hand, the area from which the image is taken remains the same while the area in which the image is placed is moved, then the same portion of the video image will move to different positions of the frame buffer and on the output display.

Figure 2:
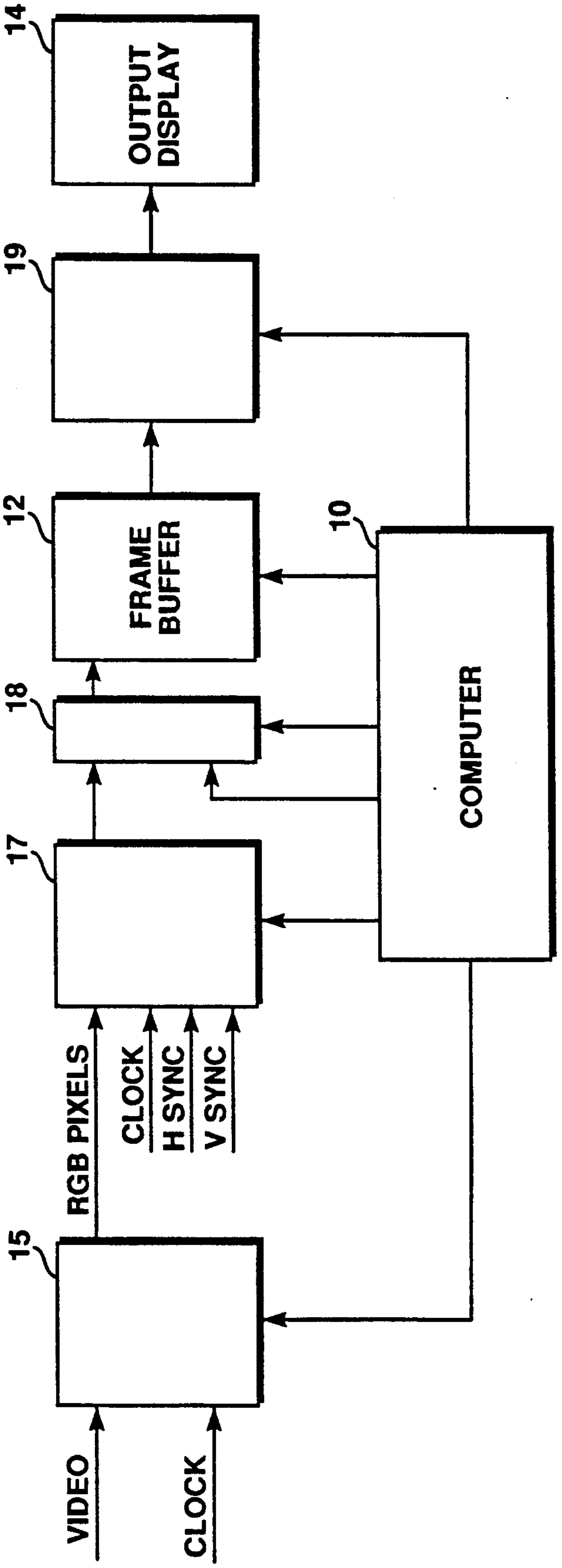
FIG. 2 is a block diagram illustrating an arrangement of the invention for storing information presented in both video and graphics form in a single frame buffer and presenting that information on a computer output display.

The general arrangement of circuitry for accomplishing the invention is illustrated in block diagram form in FIG. 2. The arrangement includes a block 10 generally referred to as a computer which includes those portions such as a central processing unit, main memory, input/output circuitry and other circuitry normally found within a general purpose computer. A frame buffer 12 and an output display 14 which would normally be considered to be parts of the computer 10 are shown separately in order to assist in better describing the invention.

Analog video signals such as NTSC or PAL signals are presented to the arrangement from a standard video source at an analog-to-digital converter circuit 15. The analog-to-digital converter circuit 15 is of a form well known to those skilled in the art. The circuit 15 receives the video signals and using the system clock converts those signals to color or black and white digitized pixels representing the incoming video information. The digitized signals representing the entire field of information (the large rectangle to the left in FIG. 1) are transferred in a stream to a circuit 17 which, under control of the computer 10, first selects that portion of the video signals of the input video information (the small rectangle to the left in FIG. 1 hereinafter called the "grab region") which is to be displayed in a window (the small rectangle to the right in FIG. 1 hereinafter called the "store region") on the output display. Each pixel which is selected from the grab region is provided an indication by the computer 10 that it is a pixel which is to appear in the store region.

Thereafter, the circuitry of circuit 17, under control of the computer 10, determines for the digitized video signals from the grab region the address in the frame buffer 12 at which they should be stored in order to appear at the desired store region on the output display.

From circuit 17, the video signals are transferred, again under control of the computer 10, through a frame buffer interface circuit 18 for storage in the frame buffer 12. The computer 10 determines for each storage position whether video or computer graphics information is to be stored; thus, the computer 10 selectively transfers information from the computer 10 or from the circuit 17 by means of the interface circuit 18. In addition to the normal frame buffer storage of pixel information, the frame buffer 12 includes a separate attribute storage area which stores for each pixel in the frame buffer 12 an indication whether that pixel represents video or computer graphics information.

Since the computer 10 controls the transfer of information to the frame buffer, it may easily control which windows are used, which windows are positioned in front of other windows, and which windows are to include video and graphics information. The computer 10 first determines all of the areas in which it wishes to present computer graphics information and indicates these in the attribute storage area of the frame buffer 12. The attribute storage area is then used as a mask to control the transfer of the video information to the frame buffer. The video information may be placed in any pixel position not designated for computer graphics information. The addresses of the store region generated in the circuit 17 are used to determine into which area the video information is actually written and are then designated as video areas in the attribute plane.

In a preferred embodiment of the invention, the attribute storage area holds one bit per pixel. This bit designates the information at the pixel as video or graphics information depending on whether a zero or a one is present. In the preferred embodiment of the invention, the attribute bits for each line stored in the frame buffer are actually stored together as the first information on each line of the frame buffer 12. These bits are separately addressable so that they may be utilized for controlling the transfer of information into the frame buffer 12. They are placed at the first of each line so that they are available to the circuit 19 when a line of data is read out of the frame buffer 12 in the single access required to read a line. A detailed description of a frame buffer providing such an attribute storage area is given in U.S. patent application Ser. No. 07/528,694, entitled APPARATUS FOR DISTINGUISHING INFORMATION STORED IN A FRAME BUFFER, Roskowski et al., filed on even date herewith, now abandoned; and is parent of the pending U.S. patent application Ser. No. 08/049,876.

With the attribute information conveniently available, the information stored in the frame buffer 12 may be transferred by an output circuit 19 to the output display 14 in such a manner that video signals will appear in appropriate form within the window on the output display 14 defined by the store region while computer graphics information will appear in appropriate form on the same display in other areas, no matter whether the output display is adapted to present interlaced output or non-interlaced output.

In order to accomplish this, the circuit 19 must be capable of translating interlaced video data into non-interlaced data and non-interlaced computer graphics data into interlaced data for presentation on output display monitors capable of displaying either interlaced data or non-interlaced data. The circuit 19 utilizes the information stored in the attribute storage area of the frame buffer 12 in order to accomplish this.

A full frame of interlaced data stored in a frame buffer to be presented on a monitor designed to display interlaced signals typically includes a first 240 lines of information available for a first field and a second 240 lines of a second field which are interleaved and offset in time to make up the complete picture. Pixels in the first field of alternate lines stored in a frame buffer holding video data actually represent times one-sixtieth of a second prior to the lines therebetween.

These signals are easily presented on a display designed to display interlaced data. However, presenting interlaced data on a monitor (such as a computer monitor) designed to display non-interlaced signals cannot be accomplished so easily. If all 480 lines of interlaced data are displayed at one time and motion has occurred between the interlaced halves of the frame, the result will be peculiar. Consequently, the two halves of the interlaced frame should never be presented in the same frame on a non-interlaced monitor. Instead, the lines of each half frame are presented separately. In order to present a full 480 lines on the non-interlace monitor, the values of the pixels in lines above and below what would otherwise be a blank line are averaged, and the average value is used to define the pixel for the blank line. If the data is twenty-four bit color data, then the bits representing the red data are separately averaged, the bits representing the green data are separately averaged, and the bits representing the blue data are separately averaged. If the data is black and white data, then all of the bits for each pixel are averaged to produce a value for the blank line pixel. This method of averaging pixels to allow interlaced data to be presented on a non-interlaced monitor is referred to as interpolation and is known in the art.

On the other hand, the non-interlaced computer graphics data has 480 lines which are not offset in time. The presentation of this data on an interlaced monitor also requires translation. If every other line were to be displayed to make up a first frame and then the alternate 240 lines were displayed to make up an interleaved second frame, the fact that the computer graphics data is of higher resolution would cause flickering which would be disconcerting to the viewer. Consequently, the lines of the non-interlaced computer graphics display must somehow be filtered to appear correct to the viewer when presented on an interlaced output monitor.

This is accomplished in the circuit 19 by a process referred to as convolution in which, if all lines are considered to be non-interlaced, 240 lines are generated by taking every other line of the frame buffer. For each such line, each pixel for that line is generated by including a quarter of the value of the pixel on the line above, a quarter of the value of the pixel on the line below, and one half the value of the pixel on the line. This provides that each pixel generated includes a portion of the line above and the line below so that variations between lines are not too drastic to the viewer. This method of generating pixels allows non-interlaced data to be presented on an interlaced monitor.

Circuitry for accomplishing the novel operations required of the circuit 19 is disclosed in co-pending patent application Ser. No. 07/456,320, entitled APPARATUS FOR PROVIDING OUTPUT FILTERING FROM A FRAME BUFFER STORING BOTH VIDEO AND GRAPHICS SIGNALS, Clough, Roskowski, Perlman, and Masterson, filed Dec. 26, 1989, now U.S. Pat. No. 5,097,257 and assigned to the assignee of the present invention.

Figure 3A:
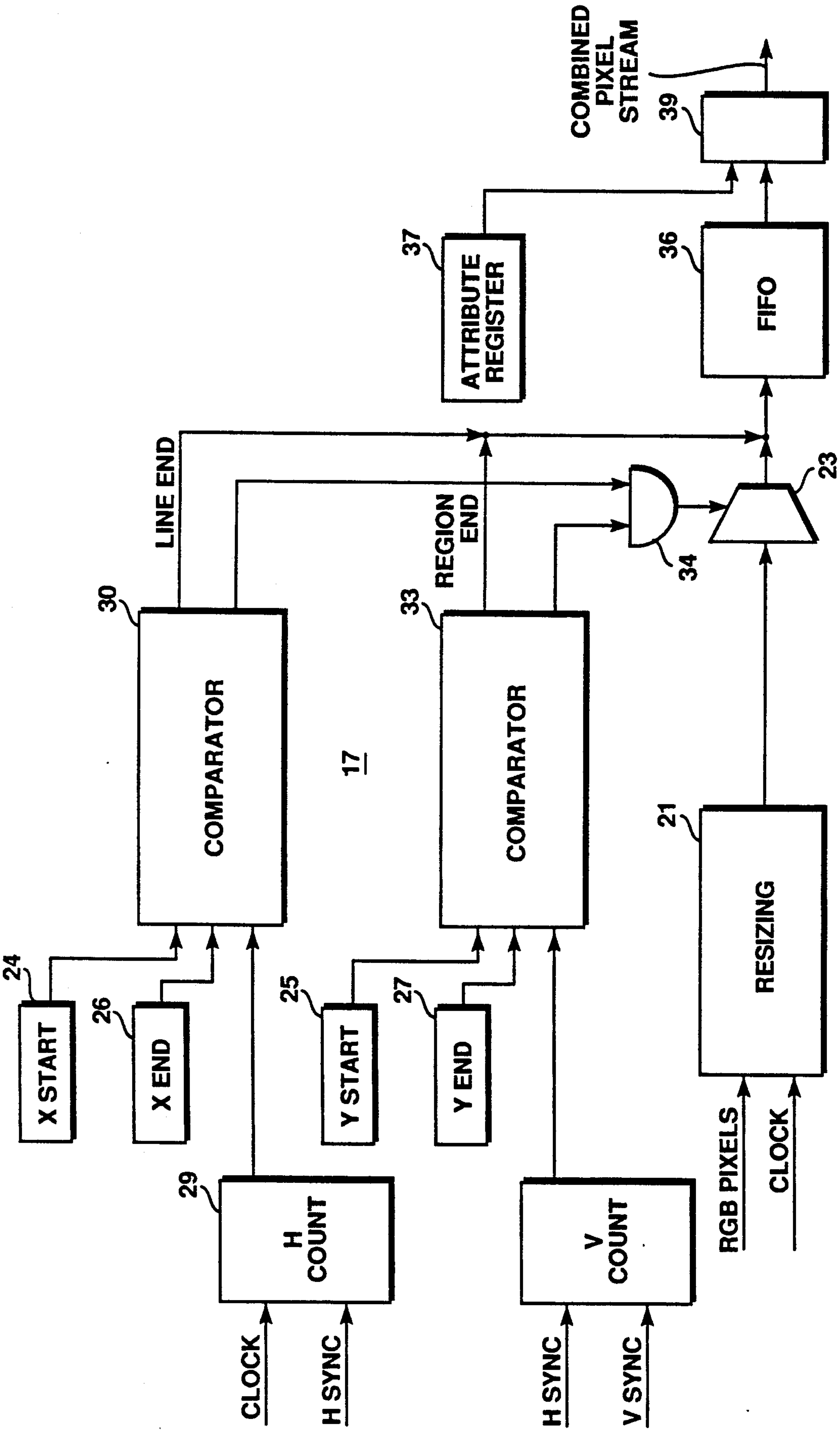
FIGS. 3(*a* and *b*) are more detailed illustrations of a portion of the arrangement illustrated in FIG. 2.
Figure 3B:
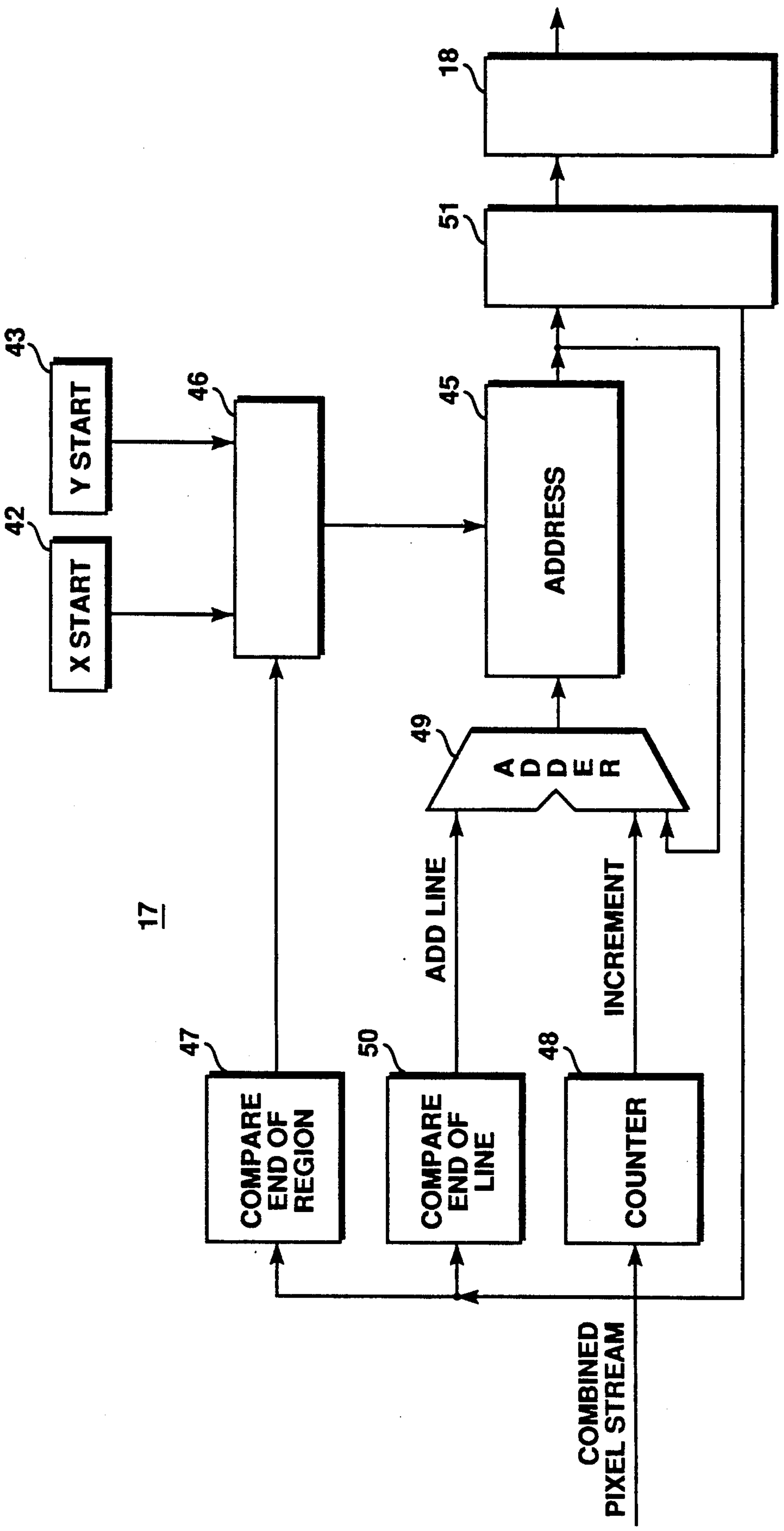

FIGS. 3(*a*) and (*b*) are a block diagram illustrating in significantly more detail the circuitry included within circuit 17 which determines the grab region of the input video field, adds an indication to the pixels in the grab region that those pixels are to be displayed, determines the addresses of the store region of the frame buffer 12 in which the video information from the grab region is to be stored, and adds those addresses to the video pixels.

The circuit 17 receives the digital video information describing a complete field of interlaced video to be transferred to the frame buffer. The pixel information is transferred to a resizing circuit 21 in which the video information may be shrunk or enlarged. Since the resizing circuitry plays no part in the present invention, it will be presumed that the video information is simply clocked through that circuit 21 without change and transferred to a gate 23.

The computer 10 decides under program control what region of the video graphics field is to be displayed (the grab region) and where on the display it is to be positioned (the store region). The starting position of this grab region (the upper left hand corner as viewed in FIG. 1) is defined by values transferred from the computer 10 to and held in X and Y start registers 24 and 25. The ending position of the grab region is defined by values transferred from the computer 10 to and held in X and Y end registers 26 and 27.

A horizontal counting circuit 29 begins a count of the horizontal position of each pixel as the horizontal synchronization signal defines a new horizontal scan line for input to the frame buffer 12. Each pixel position is defined by a succeeding clock signal until the horizontal synchronization signal indicates that the particular horizontal scan line of the frame buffer is complete. The positions along the horizontal scan lines are furnished to a comparator 30 which compares these pixel addresses with the starting and ending X values held in the registers 24 and 26. The comparator 30 provides output signals to an AND gate 34 indicating that video information may be transferred during the period of the horizontal scan line between the beginning and ending X values. After the last pixel from the grab region on each scan line, a line end signal is provided by the comparator 30 and is included in the pixel data stream.

A vertical counting circuit 31 begins a count of the vertical position of each scan line as the vertical synchronization signal defines a new field for input to the frame buffer 12. Each horizontal line of the field is then counted off by succeeding horizontal synchronization signals indicating that a horizontal line of the frame buffer is complete. The positions along the vertical scan lines are furnished to a comparator 33 which compares the line address with the starting and ending Y values held in the registers 25 and 27. The comparator 33 provides output signals to the AND gate 34 indicating that video information may be transferred during the period in which the scan lines lie between the beginning and ending Y values. After the last pixel from the grab region on the last scan line, a region end signal is provided by the comparator 33 and is included in the pixel data stream.

The signals from the comparators 30 and 33 are furnished to the AND gate 34. The simultaneous appearance of the signals from the comparators 30 and 33 causes enabling signals to allow the transfer of the pixels from the pixel stream furnished by the resizing circuit 21 which lie within the grab region of the rectangle illustrated in FIG. 1. These pixels are transferred to a first-in first-out (FIFO) storage circuit 36.

In a preferred embodiment of the invention, the FIFO circuit 36 may comprise thirty-two separate stages so that it may conveniently hold information from the video pixel stream during periods in which the computer 10 desires access to the frame buffer 12. The FIFO circuit 36 conveniently allows the circuitry which precedes that point to run at video rates of 12.27 MHz or 14.75 MHz while the circuitry following may run at a rate of 30 MHz. Since the input circuitry to the FIFO circuit 36 runs at a slower rate than the output circuitry, the stages of the FIFO circuit 36 are normally empty. This allows the output of the FIFO circuit 36 to be delayed up to thirty-two input clock cycles while the computer 10 accomplishes other types of frame buffer accesses than writing video signals to the frame buffer.

The circuit 17 also includes an attribute register 37 in which the computer 10 stores the attributes for each pixel of each line of the frame buffer. As indicated above, these attribute bits for each line are accessed in the separately addressable attribute storage area of the frame buffer 12. The computer 10 controls the area of the frame buffer in which the video information from the grab region is to be stored and does this by providing an attribute bit for each pixel stored in the frame buffer which indicates that the pixel is either video or graphics. Thus, the attribute storage area for each line includes the information designating which pixels in each line are to store video information. The computer 10 essentially directs that a line from the grab region is to be placed in a line of the store region by associating the pixels from the grab region with the video attribute bits from the store region and then, storing the pixels with video attribute bits in the store region. This is accomplished by relating each line of attribute bits, bit by bit, to the video pixels as they flow through the FIFO circuit 36 so that video attribute bits are matched to video pixels. The attribute bit register 37 thus determines for each scan line the positions to which video information may be written in the frame buffer 12. Essentially, video output from the combine circuit 39 is not enabled until a first attribute bit for video appears in the register 37. When a video attribute bit appears, the register 37 enables the combine circuit 39 to provide a combined pixel which includes the video attribute information. In this manner, a single video attribute bit is associated with each pixel of video information passed by the combine circuit 39.

From the combine circuit 39, the combined pixels are transferred to circuitry which determines the store region. This circuitry is shown in FIG. 3(*b*) and includes a pair of registers 42 and 43 which store the X and Y values of the starting position (the upper left-hand corner in FIG. 1) of the store region. These starting values are furnished under program control by the computer 10. The starting address values are placed in an address register 45 under control of a comparator circuit 47 as the preceding fill of a store region is completed. The comparator circuit 47 compares the end of grab region signal on the pixel stream with a stored value to operate an enable circuit 46.

As each pixel arrives in the combined pixel stream, an address held in the address register 45 is associated with the pixel, and a horizontal counting circuit 48 begins furnishing values to cause an adder 49 to increment the address count of the horizontal position of each pixel by one. In this manner each pixel in the combined pixel stream receives an address which increments by one along the scan line. The addresses are associated with the pixels in a combining circuit 51 and transformed to the frame buffer interface 18 for storage of the information in the frame buffer 12 at the addresses indicated.

As the end of line signal is received in the combined pixel stream indicating the end of a grab region line, a comparator 50 provides a signal to the adder 49 causing both the X and Y values of the address to be incremented by values sufficient to begin the next line of the store region. Thus, the next pixel in the combined pixel stream receives an address indicating the start of a new line in the store region. When the end of grab region signal arrives, the comparator circuit 47 resets the address for the next pixel in the pixel stream to the base address of the store region.

With each pixel beginning with the starting XY position of the store region, an address is provided for the pixel to be written. With each new pixel across the scan line the address is incremented and added to the new pixel. At the end of each scan line, the address is incremented by the value necessary to get to the beginning of the next scan line of the store region. Each address is associated with each pixel so that that pixel may be written to the proper position in the frame buffer 12. With each new scan line of pixels, a signal is also provided causing the computer 10 to increment to the next line of attribute bits to refill the attribute register 37.

Thus, it may be seen that the present invention under control of the computer conveniently selects a grab area from incoming video signals, selects a store region for those signals in the frame buffer, and provides the remainder of the frame buffer for storage of computer graphics data furnished by the computer.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer subsystem for a computer system having a central processing unit and a frame buffer capable of presenting both interlaced video and non-interlaced graphic information at a computer output device comprising means for providing video input signals representing a full frame of video data;

means for selecting those video input signals representing a rectangular portion of the full frame of video input data;

means for converting the video input signals representing the selected rectangular portion of the frame of video data into a stream of digitized pixels; and means for storing the stream of digitized pixels in a rectangular portion of the frame buffer, said means for storing including means for selecting said rectangular portion of the frame buffer, said rectangular portion being a selected rectangle of the frame buffer, and means for labelling each pixel position in the selected rectangle of the frame buffer as an area for storing pixels representing said video information and each pixel position outside of any selected rectangle of the frame buffer as an area for storing said graphics information; and means for presenting the data stored in the frame buffer on output displays handling either interlaced or non-interlaced frames, wherein each of said output displays receives the data stored in the frame buffer, such that both graphic and video information are capable of being displayed on each output display simultaneously.

2. A computer subsystem as claimed in claim 1 in which the means for labelling each pixel position in the selected rectangle of the frame buffer as an area for storing pixels representing video information comprises means for storing an attribute indication associated with each pixel in the frame buffer to indicate whether the pixel is video or computer graphics information.

3. A computer subsystem as claimed in claim 2 in which the means for storing an attribute indication associated with each pixel in the frame buffer to indicate whether the pixel is video or computer graphics information includes means for storing an attribute bit in the frame buffer associated with each pixel stored therein.

4. A computer subsystem as claimed in claim 3 in which means for storing an attribute bit in the frame buffer associated with each pixel stored therein includes a separately addressable portion of each line of the frame holding the attribute bits for the pixels of that line of the frame buffer.

5. A computer subsystem as claimed in claim 4 in which the means for storing the stream of digitized pixels in an area representing a selected rectangle of the frame buffer further comprises means for using the attribute bit associated with each pixel in the frame buffer to indicate that the pixels of the stream of digitized pixels are to be stored in the selected rectangle of the frame buffer.

6. A computer subsystem as claimed in claim 5 in which the means for using the attribute bit associated with each pixel stored in the selected rectangle of the frame buffer to indicate that the pixels of the stream of digitized pixels are to be stored in the selected rectangle of the frame buffer comprises means for storing the attribute bit related to each pixel of a scan line of the selected rectangle of the frame buffer, and means for associating the attribute bit associated with each pixel in the selected rectangle with one of the pixels of the stream of digitized pixels.

7. A computer subsystem as claimed in claim 6 in which the means for storing the attribute bit related to each pixel of a scan line of the selected rectangle of the frame buffer comprises a register for holding a selected number of bits, and the means for associating the attribute bit associated with each pixel in the selected rectangle with one of the pixels of the stream of digitized pixels comprises a combining circuit.

8. A computer subsystem as claimed in claim 3 in which the means for presenting the data stored in the frame buffer on output displays handling either interlaced or non-interlaced frames comprises means for utilizing the attribute bit applied to each pixel position in the frame buffer to determine whether the information represents video or computer graphics information.

9. A computer subsystem as claimed in claim 8 in which means for utilizing the attribute bit applied to each pixel position in the frame buffer to determine whether the information represents video or computer graphics information comprises means for responsive to the attribute bit applied to each pixel position in the frame buffer and to the type of display for translating interlaced video pixels into non-interlaced computer data.

10. A computer subsystem as claimed in claim 9 in which means for utilizing the attribute bit applied to each pixel position in the frame buffer to determine whether the information represents video or computer graphics information comprises means for responsive to the attribute bit applied to each pixel position in the frame buffer and to the type of display for translating translating non-interlaced computer data into interlaced data.

11. A computer subsystem as claimed in claim 10 in which means for utilizing the attribute bit applied to each pixel position in the frame buffer to determine whether the information represents video or computer graphics information comprises means for responsive to the attribute bit applied to each pixel position in the frame buffer and to the type of display for translating interlaced video pixels into non-interlaced computer data and for translating non-interlaced computer data into interlaced data, means for attribute bit each pixel position in the selected rectangle of the frame buffer as an area for storing pixels representing video information and each pixel position outside of any selected rectangle of the frame buffer as an area for storing graphics information.

12. A computer subsystem as claimed in claim 2 in which the means for storing the stream of digitized pixels in an-area representing a selected rectangle of the frame buffer further comprises means for using the attribute indication associated with each pixel in the frame buffer to indicate that the pixels of the stream of digitized pixels are to be stored in the selected rectangle of the frame buffer.

13. A computer subsystem as claimed in claim 12 in which the means for using the attribute indication associated with each pixel stored in the selected rectangle of the frame buffer to indicate that the pixels of the stream of digitized pixels are to be stored in the selected rectangle of the frame buffer comprises means for storing the attribute indication related to each pixel of a scan line of the selected rectangle of the frame buffer, and means for associating the attribute indication associated with each pixel in the selected rectangle with one of the pixels of the stream of digitized pixels.

14. A computer subsystem as claimed in claim 1 in which the means for storing the stream of digitized pixels in an area representing a selected rectangle of the frame buffer further comprises means for using the labelling associated with each pixel position in the selected rectangle of the frame buffer to indicate that the pixels of the stream of digitized pixels are to be stored in the selected rectangle of the frame buffer.

15. A computer subsystem as claimed in claim 14 in which the means for using the labelling associated with each pixel position in the selected rectangle of the frame buffer to indicate that the pixels of the stream of digitized pixels are to be stored in the selected rectangle of the frame buffer comprises means for storing the labelling related to each pixel of a scan line of the selected rectangle of the frame buffer, and means for associating the labelling associated with each pixel in the selected rectangle with one of the pixels of the stream of digitized pixels.

16. A computer subsystem as claimed in claim 1 in which the means for presenting the data stored in the frame buffer on output displays handling either interlaced or non-interlaced frames comprises means for utilizing the labelling applied to each pixel position in the frame buffer to determine whether the information represents video or computer graphics information.

17. A computer subsystem as claimed in claim 16 in which means for utilizing the labelling applied to each pixel position in the frame buffer to determine whether the information represents video or computer graphics information comprises means for responsive to the labelling applied to each pixel position in the frame buffer and to the type of display for translating interlaced video pixels into non-interlaced computer data.

18. A computer subsystem as claimed in claim 16 in which means for utilizing the labelling applied to each pixel position in the frame buffer to determine whether the information represents video or computer graphics information comprises means for responsive to the labelling applied to each pixel position in the frame buffer and to the type of display for translating translating non-interlaced computer data into interlaced data.

19. A computer subsystem as claimed in claim 16 in which means for utilizing the labelling applied to each pixel position in the frame buffer to determine whether the information represents video or computer graphics information comprises means for responsive to the labelling applied to each pixel position in the frame buffer and to the type of display for translating interlaced video pixels into non-interlaced computer data and for translating non-interlaced computer data into interlaced data, means for labelling each pixel position in the selected rectangle of the frame buffer as an area for storing pixels representing video information and each pixel position outside of any selected rectangle of the frame buffer as an area for storing graphics information.

* * * * *